Dec. 18, 1928.
N. L. MOCHEL
TURBINE BLADE LASHING
Filed Oct. 28. 1927
1,695,971
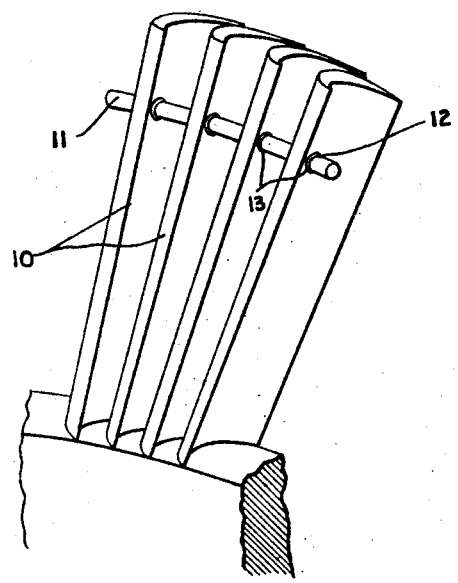
WITNESSES:
E. Lutz
INVENTOR
N.L. Mochel
BY
ATTORNEY Patented Dec. 18, 1928.

1,695,971

UNITED STATES PATENT OFFICE.

NORMAN L. MOCHEL, OF RIDLEY PARK, PENNSYLVANIA, ASSIGNOR TO WESTINGHOUSE ELECTRIC & MANUFACTURING COMPANY, A CORPORATION OF PENNSYLVANIA.

TURBINE-BLADE LASHING.

Application filed October 28, 1927. Serial No. 229,466.

My invention relates to turbine blading and it has for its object to provide improved lashing means for apparatus of this character.

Where turbine blades are made of stainless iron or steel, it is desirable to use lashing which will facilitate soldering of the lashing to the blades, which is noncorrosive, which stands up under high temperatures and which will not harden in cooling after soldering. I have discovered that these desirable objectives may be achieved if the lashing wire or member is made of nickel and silver soldered to the stainless iron or steel blades.

In order that my invention may be more clearly understood, reference should be made to the accompanying drawing, wherein the figure is a fragmentary view of a lashed group of blades.

In the drawing, I show a plurality of blades 10 connected by a lashing 11, the lashing 11 preferably passing through openings 12 provided in the blades 10 and the lashing and the blades preferably being positively connected together, as by soldering. In accordance with my invention, the blades 10 are made of stainless iron or steel, the lashing 11 is made of nickel, or any equivalent material having the properties of non-corrosiveness, resistance to high temperatures, and which will not harden in cooling down after soldering. The nickel lashing wire 11 is connected to the blades by silver solder as indicated at 13.

From the foregoing, it will be apparent that I have provided lashing which is quite as durable as the blades in connection with which it is used, that is, nickel is noncorrosive. In addition to this desirable physical property, nickel will withstand high temperatures and will not harden in cooling down after the soldering operation. While I have referred to stainless iron or steel blades, it will be understood by those skilled in the art that any iron or steel alloy having desirable physical properties, including the property of non-corrosiveness, may be used. It will be furthermore understood that any equivalent of nickel, such as certain nickel alloys, may be used for the lashing provided it has the properties of non-corrosiveness, resistance to high temperature, and will not harden in cooling down after soldering.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a turbine the combination of a group of turbine blades made of relatively non-corrosive iron alloy and a substantially homogeneous nickel lashing member connected to the blades.

2. In a turbine the combination of a group of stainless steel turbine blades and a substantially homogeneous nickel lashing member connected to the blades by silver solder.

In testimony whereof, I have hereunto subscribed my name this 17th day of October, 1927.

NORMAN L. MOCHEL.